United States Patent
Akimoto et al.

[19]

[11] Patent Number: 5,861,594
[45] Date of Patent: Jan. 19, 1999

[54] LEVER SWITCH APPARATUS

[75] Inventors: Hideaki Akimoto; Takeshi Shibata, both of Tokyo, Japan

[73] Assignee: Niles Parts Co., Ltd.

[21] Appl. No.: 988,003

[22] Filed: Dec. 10, 1997

[30] Foreign Application Priority Data

Dec. 11, 1996 [JP] Japan .................................. 8-346570

[51] Int. Cl.⁶ ................................................ H01H 25/00
[52] U.S. Cl. .................................... 200/61.54; 200/61.27
[58] Field of Search ........................... 200/4, 6 A, 17 R, 200/61.27–61.35, 61.54, 332, 335

[56] References Cited

U.S. PATENT DOCUMENTS

| | | | |
|---|---|---|---|
| 4,137,438 | 1/1979 | Sato et al. ........................... | 200/153 H |
| 4,379,954 | 4/1983 | Iwata et al. ................................. | 200/4 |
| 4,939,540 | 7/1990 | Kamada et al. ........................ | 335/190 |
| 5,397,870 | 3/1995 | Noro ...................................... | 200/335 |
| 5,672,855 | 9/1997 | Uchiyama et al. ..................... | 200/61.3 |

*Primary Examiner*—Michael A. Friedhofer
*Attorney, Agent, or Firm*—Rader, Fishman & Grauer; Ronald P. Kananen

[57] ABSTRACT

A lever switch apparatus has a lever operable in a plurality of directions, which, when operating the lever in a certain direction, prevents against erroneous operation of a movable board by rendering the movable board immovable in an irrelevant direction of lever operation. The lever switch apparatus has a lever 2 and a movable board 3A. The lever 2 is swingable in a first direction and a second direction about a first axis 21 and a second axis 22, and has an engager 23 on a tip side thereof. The movable board 3A is swingable in a third direction about a third axis 31A, and has an elongate hole 32A extending in the second direction and a contact piece 33A. The engager 23 is engaged with a wall surface 34A of the elongate hole 32A. The elongate hole 32A is formed in a curved form corresponding to a swing path of the engager 23 to prevent erroneous operation of the movable board 3A during movement of the lever 2 in certain directions.

9 Claims, 5 Drawing Sheets

LEVER SWITCH APPARATUS

BACKGROUND OF THE INVENTION

Field of the Invention

The present invention relates generally to switches for automotive vehicles and, in particular, to an improvement in a lever switch apparatus for use in a combination switch or the like, which is adapted to control, for example, a lighting system, a wiper system and a turn signal system from a driver's seat of an automotive vehicle.

Description of the Related Art

A conventional lever switch apparatus is shown, for example, in FIGS. 4 and 5 of the accompanying drawings. This conventional apparatus includes a lever 2 supported by a switch main body 1 so that the lever 2 is swingable respectively in first and second directions about a first axis 21 and a second axis 22. The lever 2 has an engager 23 on a tip side thereof. A movable board 3 is provided, which is supported by the switch main body 1 for swinging in a third direction about a third axis 31. The movable board 3 has an elongate hole 32 extending in the second direction and a contact piece 33. The engager 23 is engaged with a wall surface in the elongate hole 32, thereby interlocking the movable board 3 to the lever 2.

More specifically, the lever 2 at its first axis 21 is fitted with a lever support member 24 to be swingable in the first direction. The lever support member 24 has an inner surface formed by a cam 27 with which a steel ball 25 provided on the lever 2 is in press-contact through a spring 26. This provides nodal feeling through the lever 2 during operation thereof in the first direction. The lever support member 24 is formed, in an outer periphery thereof, with the second axis 22, which is fitted in a cover 11 of the switch main body 1. Accordingly, the lever 2 and the lever support member 24 are swingable, in one body, in the second direction.

The cover 11 is elastically fitted with a case 12 of the switch main body 1 to thereby support the lever support member 24 together with the lever 2 in the switch main body 1. Also, the case 12 incorporates therein the movable board 3 that is connected to and disconnected from a fixed contact (not shown) for switching operation. The fixed contact is provided on an inner surface 16 of a polarity board 15 elastically fitted by the case 12. The case 12 also incorporates a first movable contact 13 and a second movable contact 14. The movable board 3 is engaged with the engager 23 of the lever 2. The first movable contact 13 is engaged with a first operator 28 provided at a lower end of the lever support member 24. The second movable contact 14 is engaged with a second operator 29 that is operated by a rotating knob (not shown) of the lever 2.

In the conventional lever switch apparatus structured as above, when the lever 2 is operated in the first direction, the movable board 3 is swung through the interaction therewith so that the contact piece 33 swings over the fixed contact of the polarity board 15, thereby performing switching operation. For example, when the lever 2 is operated from a position shown by a solid line A to a position shown by a hypothetical line B in FIG. 4 against a nodal force of the cam 27, the engager 23 is caused to swing about the first axis 21 from a position shown by a one-dot chain line C in FIG. 4 to a position shown by a hypothetical line D. Thereupon, the movable board 3 is pushed by the engager 23 to be swung from a position shown by a solid line E to a position shown by a hypothetical line F. This causes the contact piece 33 to slide over the fixed contact of the polarity board 15, thus performing switching operation.

On the other hand, when the lever 2 is operated in the second direction shown by a solid line G and hypothetical lines H and I in FIG. 5, the lever support member 24 is caused to swing together with the lever 2. Thereupon, the first operator 28 at the lower end of the lever support member 24 actuates a first movable contact 13. This causes the first movable contact 13 to slide over the fixed contact of the polarity board 15, thereby performing switching operation. Incidentally, the conventional lever-switch apparatus described above is also disclosed, for example, in Japanese Unexamined Utility Model Publication No. H2-137724.

In the conventional apparatus described above, however, there has been a problem that, when the lever 2 is operated in the second direction to actuate the first movable contact 13, the movable board 3 is erroneously actuated by the operation of the lever 2 in the second direction, despite that the movable board 3 has to be immovable for the operation in the second direction. For example, when the lever 2 is operated in the second direction, if the operating position of the lever 2 is at a position shown by the solid line G or the hypothetical line I, the engager 23 is displaced to a position of J or L. In this case, the movable board 3 is at a position shown by the solid line M. However, if the lever 2 is operated to a position shown by the hypothetical line H, the engager 23 is displaced to a position K. Consequently, the movable board 3 is depressed by the engager 23 to be moved to a position shown by a hypothetical line N. That is, the movable board 3 has been erroneously operated.

SUMMARY OF THE INVENTION

An object of the present invention is to provide a construction of a lever switch for a vehicle that solves the problems associated with the conventional lever switch apparatus described above by changing only the design of the movable board.

More specifically, it is an object of the present invention to provide a lever switch apparatus having a lever operable in a plurality of directions, and a construction that prevents against erroneous operation of a movable board by rendering the movable board immovable when the lever is operated in a certain direction.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a lever switch apparatus for a vehicle is provided, comprising: a lever supported by a switch main body to be swingable in a first direction and a second direction about a first axis and a second axis, the lever having an engager on a tip side thereof; a movable board supported by the switch main body to be swingable in a third direction about a third axis, the movable board having an elongate hole extending in the second direction and a contact piece; wherein the engager is engaged with a wall surface of the elongate hole so that the movable board is interlocked with the lever, and the lever switch apparatus is characterized by the elongate hole in the movable board being formed in a curved form.

The elongate hole is preferably formed curved in a manner corresponding to a swing path of the engager. The elongate hole is preferably formed curved about the second axis or about a position adjacent to the second axis.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A preferred embodiment of a lever switch apparatus according to the present invention will now be described in detail with reference to FIGS. 1 to 3 of the accompanying drawings.

Figure 1:
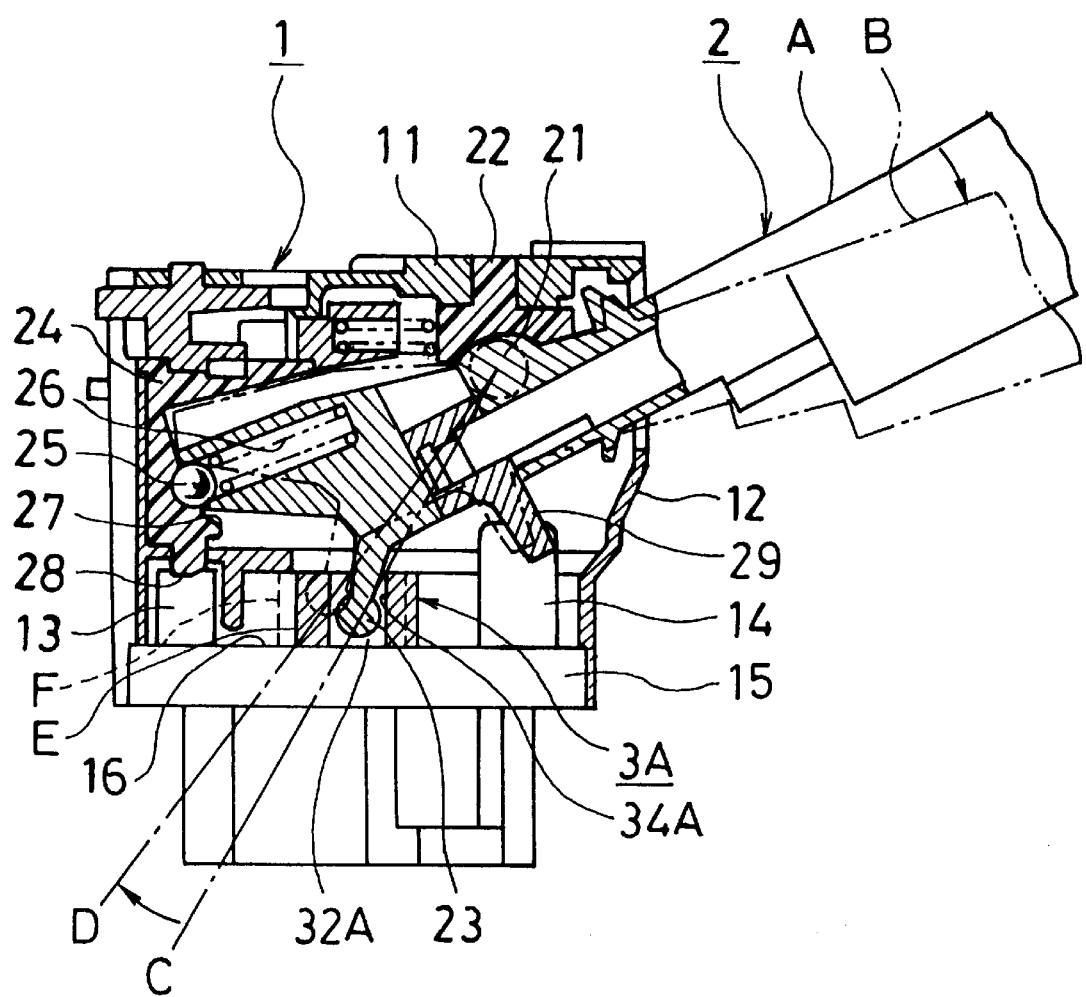
FIG. 1 is a sectional view showing a lever switch apparatus according to a preferred embodiment of the present invention.
Figure 2:
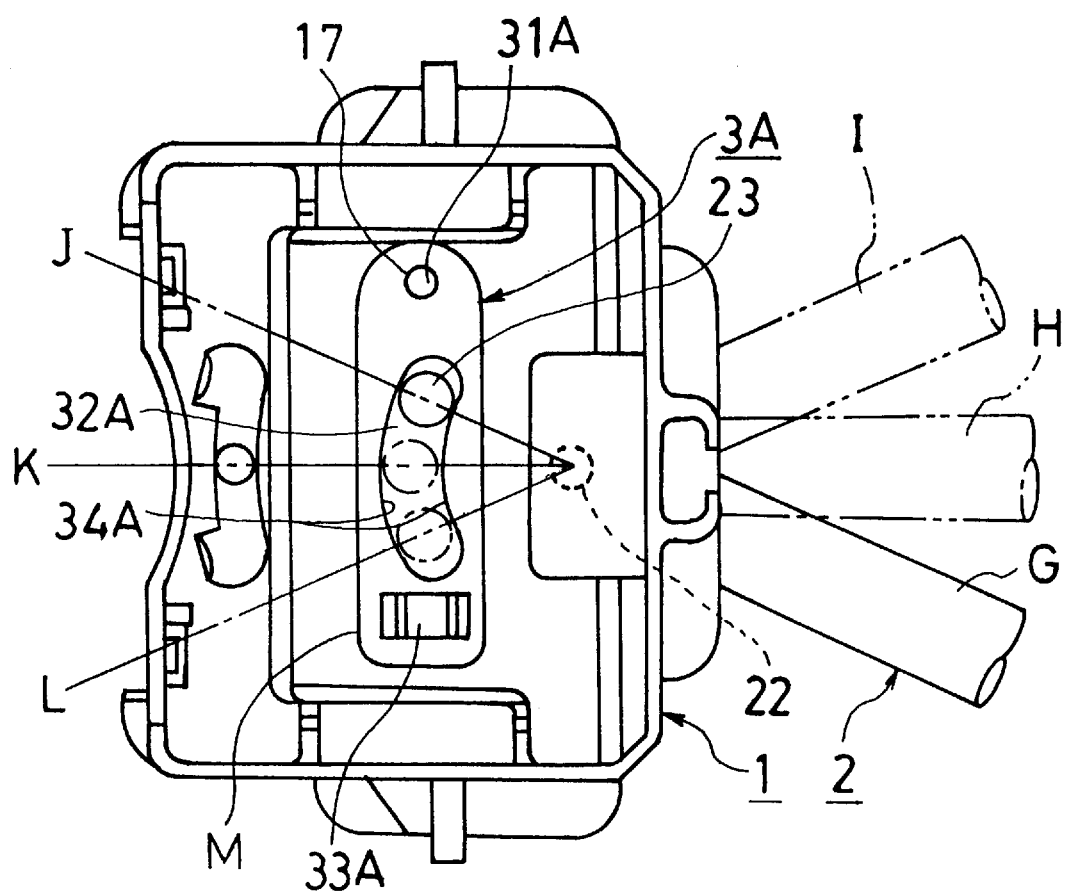
FIG. 2 is a bottom view of the lever switch apparatus shown in FIG. 1.
Figure 3:
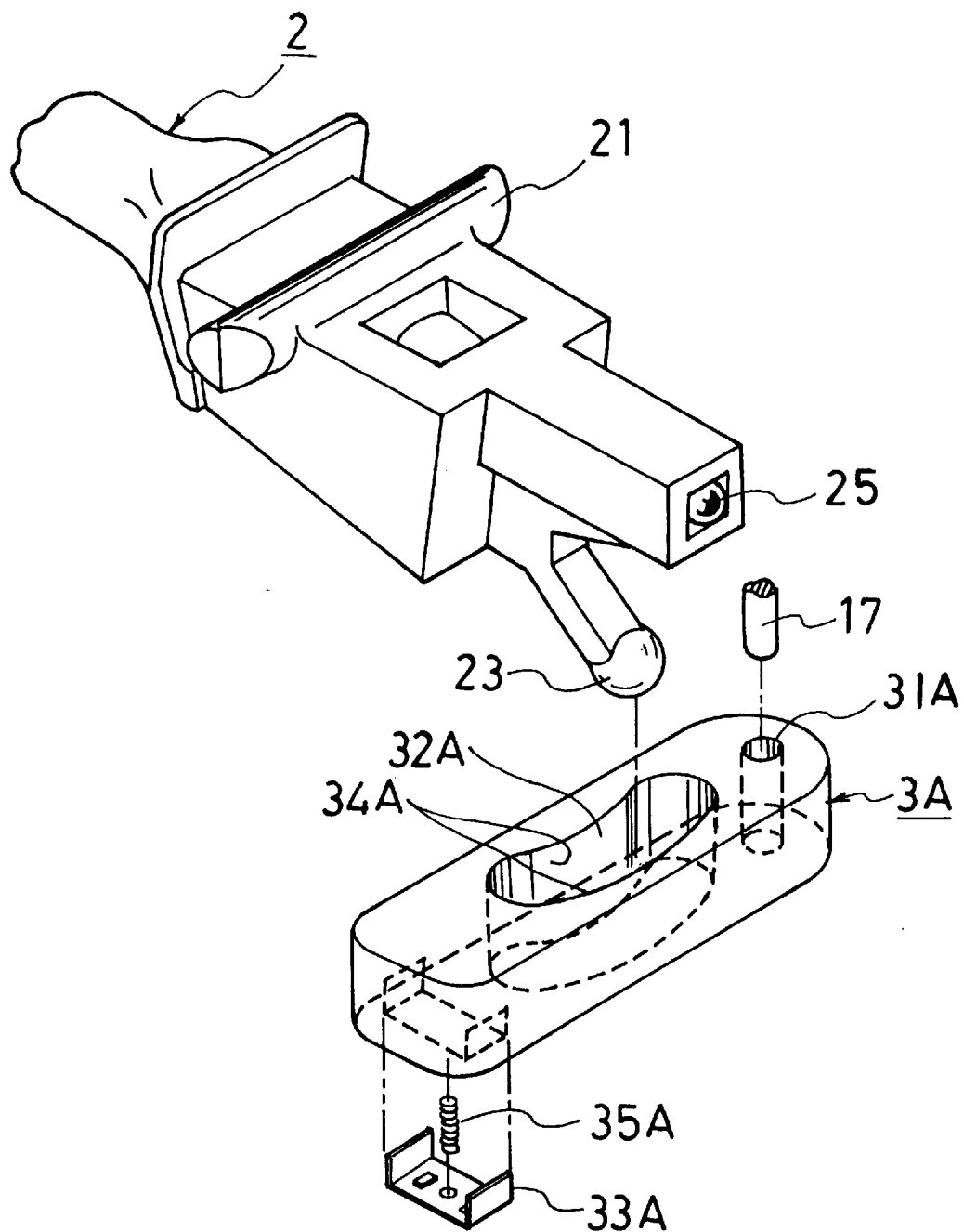
FIG. 3 is an exploded perspective view showing in detail a lever and a movable board for use in the lever switch apparatus according to the present invention.
Figure 4:
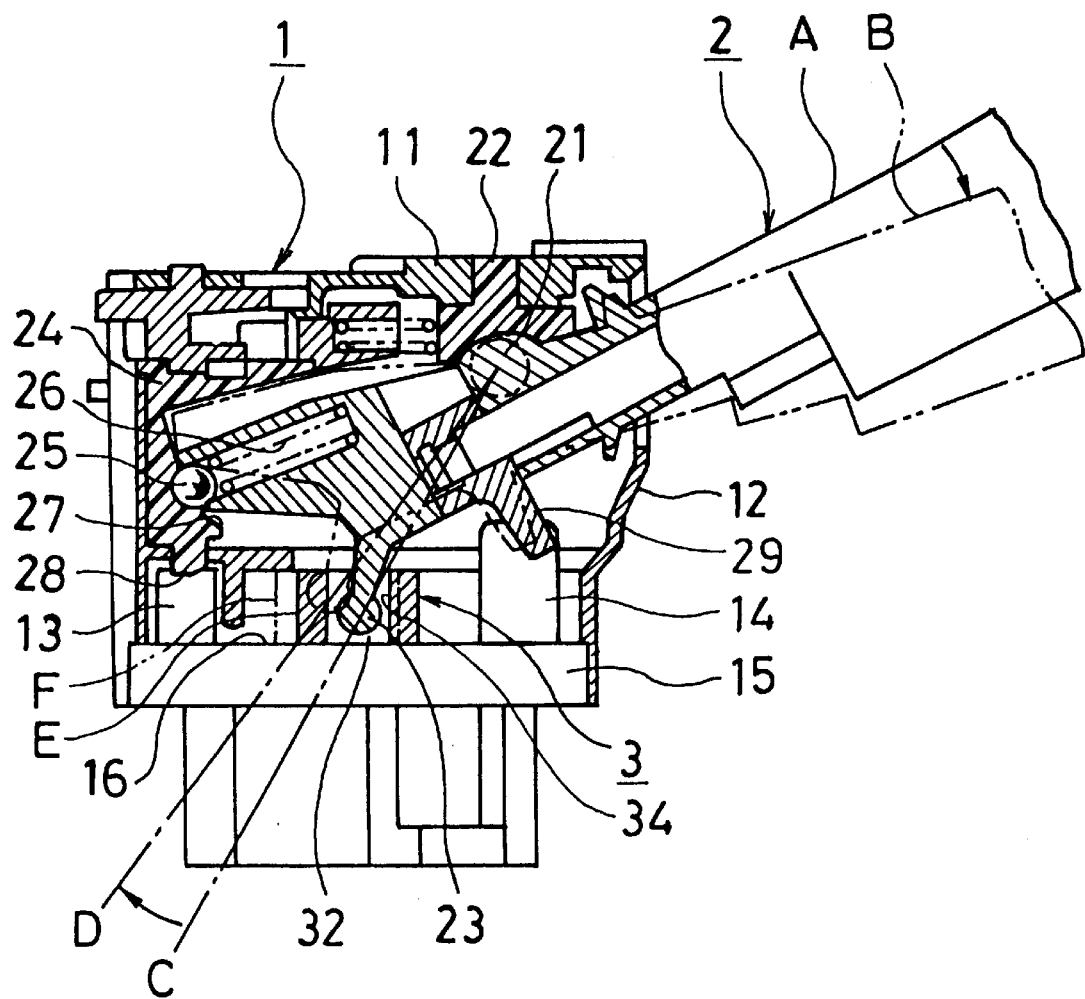
FIG. 4 is a sectional view showing a conventional lever switch apparatus.
Figure 5:
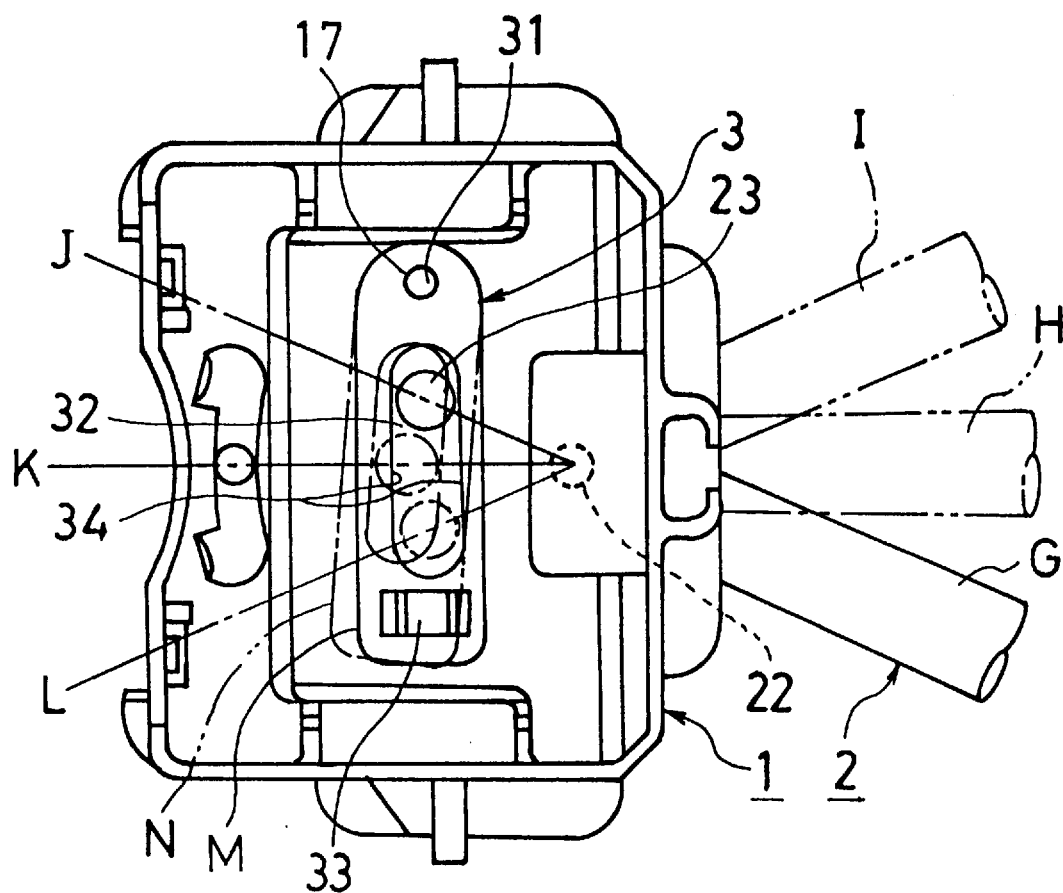
FIG. 5 is a bottom view of the conventional lever switch apparatus shown in FIG. 4.

The structure of the lever switch apparatus shown in FIGS. 1 to 3 is generally the same as the structure of the conventional lever switch apparatus shown in FIGS. 4 and 5, except for the structure of a movable board 3A. Thus, the same structural parts are denoted by the same reference characters in FIGS. 1 to 3, and further explanations thereof are omitted in view of the explanations of the same structural parts provided above.

The movable board 3A is supported by the switch main body 1, similarly to the movable board 3 of the conventional art. The movable board 3A is arranged for swinging in the third direction about a third axis 31A. The movable board 3A has an elongate hole 32A extending in the second direction and a contact piece 33A. The elongate hole 32A is formed curving corresponding to a swing path for the engager 23. For example, the elongate hole 32A is curved about the second axis 22, as shown in FIG. 2.

In the lever switch apparatus thus structured, if the lever 2 is operated in the first direction, the movable board 3A is actuated by interacting therewith so that the contact piece 33A slides over the fixed contact of the polarity board 15 to perform switching operation. For example, if the lever 2 is operated against the nodal force of the cam 27 from a position shown by a solid line A to a position shown by a hypothetical line B, the engager 23 is swung about the first axis 21 from a position shown by a one-dot chain line C to a position shown by a one-dot chain line D in FIG. 1. Accordingly, the movable board 3A is depressed by the engager 23 to be swung from a position shown by a solid line E to a position shown by a hypothetical line F in a manner similar to the conventional lever switch apparatus shown in FIGS. 4 and 5. This causes the contact piece 33A to slide over the fixed contact of the polarity board 15, thereby performing switching operation.

Meanwhile, if the lever 2 is operated in the second direction shown by a solid line G and hypothetical lines H and I in FIG. 2, the lever support member 24 is swung together with the lever 2. Accordingly, the first operator 28 at the lower end of the lever support member 24 actuates the first movable contact 13. This causes the first movable contact 13 to slide over the fixed contact of the polarity board 15, thereby performing switching operation.

At this time, since the elongate hole 32A of the movable board 3A is formed curved about the second axis 22 as stated above, when the lever 2 is operated, for example, in the second direction, i.e., in a range shown by the solid line G and the hypothetical lines H and I in FIG. 2, to actuate the first movable contact 13, the movable board 3A, which has no bearing on the operation in the second direction, is not acted upon by a depression force of the engager 23. Consequently, the movable board 3A remains at a position shown by a solid line M in FIG. 2. That is, when the lever 2 is operated in the second direction, the movable board 3A, which has no bearing on the direction of operation, is immovable.

Incidentally, the elongate hole 32A may be curved about a position adjacent to the second axis 22. It is also possible in the present invention to make various other modifications.

A lever switch apparatus of the present invention has a lever supported by a switch main body to be swingable in a first direction and a second direction about a first axis and a second axis, and has an engager on a tip side of the lever. A movable board is supported by the switch main body to be swingable in a third direction about a third axis. The movable board has an elongate hole extending in the second direction and a contact piece. The engager on the tip side of the lever is engaged with a wall surface of the elongate hole so that the movable board is interlocked with the lever. The lever switch apparatus according to the present invention is characterized by the elongate hole being formed in a curved form. Therefore, when the lever is operated in a certain direction, there is obtained an effect that the movable board is rendered immovable in directions other than the operational direction so that the movable board is prevented from erroneously operating.

In the present invention, the elongate hole is formed curved about the second axis or a portion adjacent to the second axis, thereby providing in addition to the above effect an effect that an appropriate elongate form for rendering the movable board immovable can be easily designed.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A lever switch apparatus, comprising:
    a lever (2) supported by a switch main body (1) to be swingable in a first direction and a second direction about a first axis (21) and a second axis (22), said lever (2) having an engager (23) on a tip side thereof;
    a movable board (3A) supported by said switch main body (1) to be swingable in a third direction about a third axis (31A), said movable board (3A) having an elongate hole (32A) extending in the second direction and a contact piece (33A);
    wherein said engager (23) is engaged with a wall surface (34A) of said elongate hole (32A) so that said movable board (3A) is interlocked with said lever (2); and
    wherein said elongate hole (32A) is formed in a curved form to prevent erroneous operation of said movable board (3A) during movement of said lever (2) in certain directions.

2. The lever switch apparatus according to claim 1, wherein said elongate hole (32A) is formed curved in a manner corresponding to a swing path of said engager (23).

3. The lever switch apparatus according to claim 2, wherein said elongate hole (32A) is formed curved about the second axis (22).

4. The lever switch apparatus according to claim 2, wherein said elongate hole (32A) is formed curved about a position adjacent to the second axis (22).

5. The lever switch apparatus according to claim 1, wherein said elongate hole (32A) is formed curved about the second axis (22).

6. The lever switch apparatus according to claim 1, wherein said elongate hole (32A) is formed curved about a position adjacent to the second axis (22).

7. A lever switch apparatus, comprising:
- a lever (2) supported by a switch main body (1) to be swingable in a first direction about a first axis (21) and in a second direction about a second axis (22), said lever (2) having an engager (23) on a tip portion thereof;
- a movable board (3A) supported by said switch main body (1) to be swingable in a third direction about a third axis (31A), said movable board (3A) having an elongate hole (32A) extending in the second direction and a contact piece (33A);

wherein said engager (23) is engaged with a wall surface (34A) of said elongate hole (32A) so that said movable board (3A) is interlocked with said lever (2) and moved in said third direction about said third axis (31A) when said lever (2) is moved in said first direction about said first axis (21); and wherein said elongate hole (32A) is formed in a curved form in a manner corresponding to a swing path of said engager (23) to thereby prevent erroneous operation of said movable board (3A) during movement of said lever (2) in said second direction about said second axis (22).

8. The lever switch apparatus according to claim 7, wherein said elongate hole (32A) is formed curved about the second axis (22).

9. The lever switch apparatus according to claim 7, wherein said elongate hole (32A) is formed curved about a position adjacent to the second axis (22).

* * * * *